United States Patent [19]
Saxe et al.

[11] Patent Number: 5,650,872
[45] Date of Patent: Jul. 22, 1997

[54] LIGHT VALVE CONTAINING ULTRAFINE PARTICLES

[75] Inventors: Robert L. Saxe, New York; Robert I. Thompson, Plainview; Matthew Forlini, Ozone Park, all of N.Y.

[73] Assignee: Research Frontiers Incorporated, Woodbury, N.Y.

[21] Appl. No.: 372,669

[22] Filed: Jan. 13, 1995

Related U.S. Application Data

[63] Continuation-in-part of Ser. No. 351,665, Dec. 8, 1994, abandoned.

[51] Int. Cl.⁶ .................................................. G02B 26/00
[52] U.S. Cl. .................................................. 359/296
[58] Field of Search .................................................. 359/296

[56] References Cited

U.S. PATENT DOCUMENTS

| | | | |
|---|---|---|---|
| 3,773,684 | 11/1973 | Marks | 348/18 |
| 4,207,841 | 6/1980 | Saxe | 350/374 |
| 4,407,565 | 10/1983 | Saxe | 350/374 |
| 4,877,313 | 10/1989 | Saxe et al. | 350/391 |
| 5,002,701 | 3/1991 | Saxe | 252/586 |
| 5,030,669 | 7/1991 | Hendrickson et al. | 523/383 |
| 5,104,210 | 4/1992 | Tokas | 359/296 |
| 5,106,533 | 4/1992 | Hendrickson et al. | 252/314 |
| 5,130,057 | 7/1992 | Saxe | 252/585 |
| 5,326,692 | 7/1994 | Brinkley et al. | 435/6 |

Primary Examiner—Georgia Y. Epps
Assistant Examiner—Thomas Robbins
Attorney, Agent, or Firm—Graham & James LLP

[57] ABSTRACT

An electro-optical device, such as a light valve, has a cell formed of opposed cell walls, a light-modulating unit comprising a suspension containing anisometric particles suspended in a liquid suspending medium between the cell walls, and opposed electrodes operatively associated with the cell walls for applying an electrical field across the suspension, the anisometrically shaped particles having an average particle size of about 0.1 microns or less.

7 Claims, 2 Drawing Sheets

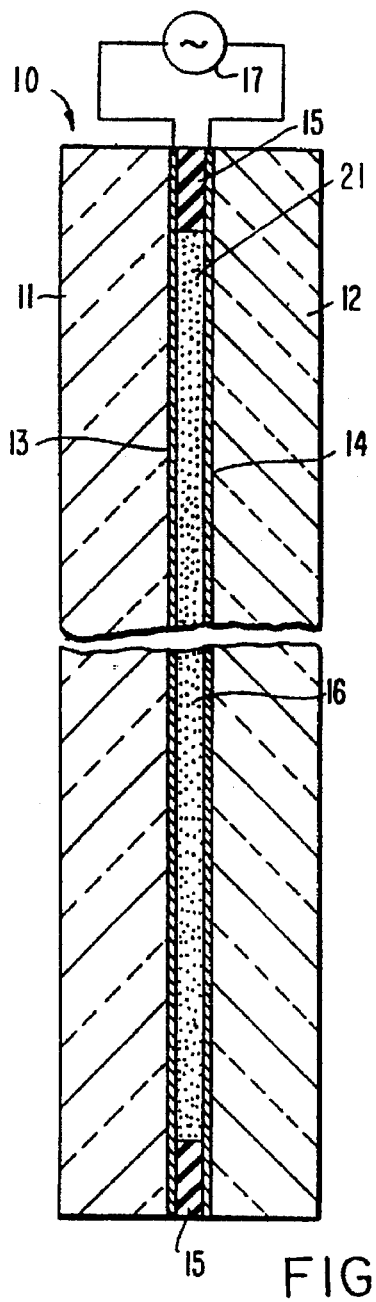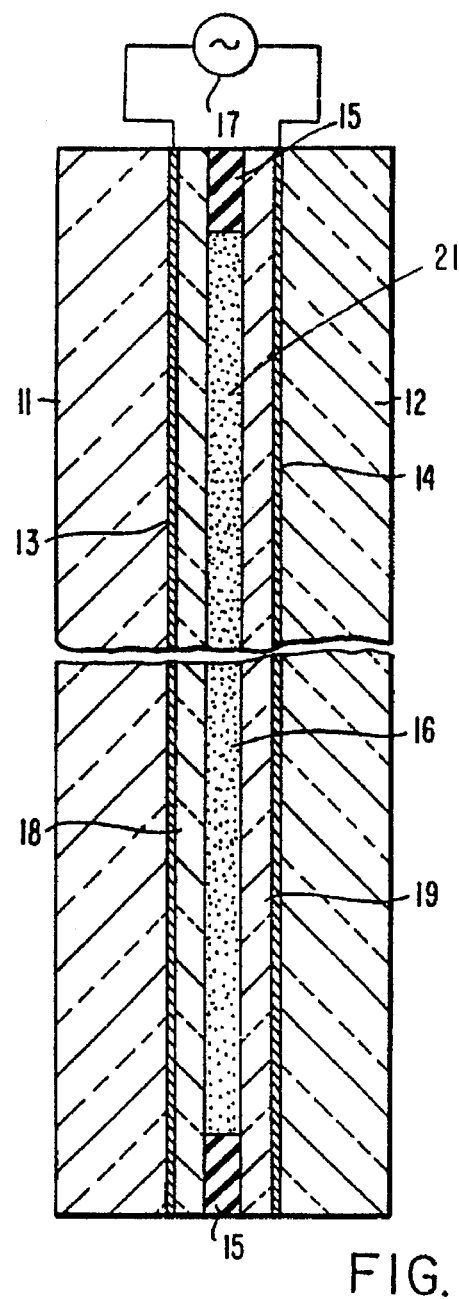
FIG. 1    FIG. 2
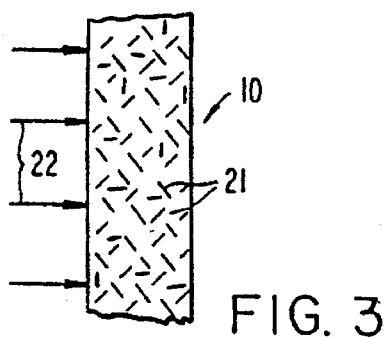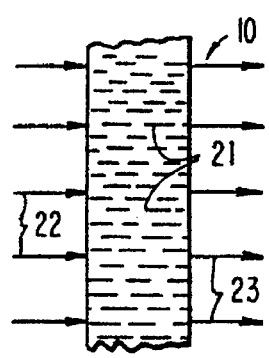
FIG. 3    FIG. 4

5,650,872

LIGHT VALVE CONTAINING ULTRAFINE PARTICLES

This is a continuation-in-part of application Ser. No. 08/351,665, filed Dec. 8, 1994, now abandoned, entitled Light Valve Containing Ultrafine Particles.

FIELD OF THE INVENTION

The present invention relates to electro-optical devices, such as light valves, and more particularly to electro-optical devices, such as light valves, comprising a suspension containing ultra-fine particles suspended in a liquid suspending medium.

THE LIGHT VALVE

Light valves have been used for over sixty years for modulation of light. A light valve may be described as a cell formed of two walls that are spaced apart by a small distance, at least one wall being transparent, the walls having electrodes thereon usually in the form of transparent conductive coatings, with a light modulating unit between the walls. The light modulating unit of the cell is a "light valve suspension", which may be a liquid suspension of small particles suspended in a liquid suspending medium. Alternatively, the light modulating unit may be a film comprising droplets of liquid light valve suspension distributed throughout the film. In the absence of an applied electrical field, the particles in the liquid light valve suspension exhibit random Brownian movement, and hence a beam of light passing into the cell is reflected, transmitted or absorbed, depending upon the nature and concentration of the particles and the energy content of the light. When an electric field is applied through the liquid light valve suspension in the light valve, the particles become aligned.

There are three types of liquid light valve suspensions. In the first, and most usual, type of liquid light valve suspension, light transmission through the light valve suspension increases when voltage is applied across the suspension and as the voltage increases. See U.S. Pat. Nos. 1,961,664 and 2,290,582 which are incorporated herein by reference thereto. In a second type of liquid light valve suspension, light transmission decreases when voltage is applied and as voltage increases. See U.S. Pat. No. 4,078,856 which is incorporated herein by reference thereto. In the third type of liquid light valve suspension, transmission increases in part of the electromagnetic spectrum and simultaneously decreases in another part of the spectrum as voltage is applied and as the voltage increases. See U.S. Pat. No. 3,743,382 which is incorporated herein by reference thereto.

Light valves have been proposed for many purposes including, e.g., alphanumeric displays, television displays, windows, mirrors, eyeglasses and the like to control the amount of light passing therethrough.

The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed. Alternatively, the liquid suspending medium itself may provide all or part of the polymeric stabilizer.

BACKGROUND OF THE INVENTION

Many kinds of pigments known in the art are used as colorants, for examples in paints, varnishes and inks. Generally such pigments have average particle sizes in the range of 0.1 to 10 microns but usually 1 micron or greater. To obtain these small sized particles, mechanical devices are often used to comminute solid particles into smaller ones. Ball mills, attritors, and bead mills and roll mills are commonly used for such purposes.

The use in a light valve suspension of particles produced by such mechanical methods is not practical, however, for several important reasons. First, the particles are usually too large, generally having an average size (diameter) of 1 micron or greater. Secondly, even if sub-micron sized particles are produced, the grinding and comminution process tends to make such particles spherical in shape or amorphous, reducing or virtually eliminating their aspect ratio. For use in a light valve suspension, as is well known in the art, anisometrically shaped particles are important; hence particles shaped like needles, rods or plates and the like are preferred and generally necessary because their anisometric shape facilitates orientation in an electric or magnetic field. Thirdly, an inherent disadvantage of mechanical comminution is that there is a large distribution of sizes, generally resulting in the presence of particles having a size of 1 micron or more even if the average particle size is less than 1 micron. Particles larger than 0.2 micron (one-half the wavelength of blue light) tend to scatter light, and such scattering increases exponentially with particle size. This fact and the fact that relatively large particles promote agglomeration are additional reasons why such comminuted particles are not desirable for use in a light valve suspension. There is thus a need in the art for light valves containing a light valve suspension of ultrafine particles.

Moreover, while various types of particles have been suggested in the prior art for use in light valves, heretofore it has not been practical to obtain particles of a submicron size and anisometric shape and good optical properties, except for polyiodide particles. However, in some cases polyiodide particles may not be sufficiently stable to ultraviolet radiation, and light valve suspensions of such polyiodide particles may degrade in terms of color and performance if exposed to intense ultraviolet radiation for a prolonged period of time unless UV absorbers are included in the light valve suspension. Also, nearly all polyiodide particles are limited to a blue color, whereas it is also desirable to have light valve suspensions which have off-state colors which are not blue. Accordingly, new types of particles for light valve suspensions are needed which will be suitably small and anisometrically shaped, which will tolerate high levels of ultraviolet radiation for long periods of time without significant degradation and/or which have a variety of off-state colors.

DESCRIPTION OF THE INVENTION

The present invention now provides an electro-optical device, such as a light valve or electrophoretic display, comprising a cell formed of opposed cell walls, a light-modulating unit comprising a suspension containing anisometric particles suspended in a liquid suspending medium between said cell walls, and opposed electrode means operatively associated with said cell walls for applying an electrical field across said suspension, the anisometric particles having an average particle size of about 0.2 microns or less, preferably about 0.1 micron or less.

In another embodiment of the invention, a light valve is provided comprising a cell formed of opposed cell walls, a light-modulating unit comprising a liquid light valve suspension containing ansometric particles suspended in a liquid suspending medium between said cell walls, and opposed electrode means operatively associated with said cell walls for applying an electrical field across said suspension, said anisometric particles having been prepared by the Evaporative Dispersion Process, and said liquid light valve suspension being capable of decreasing the transmission of light therethrough when an electrical field is applied across said suspension.

The liquid light-modulating suspensions used in the present invention have a wide array of off-state colors and can include materials superior to polyiodide particles in terms of their ability to tolerate high levels of ultraviolet radiation for long periods of time without serious degradation. Since the ultrafine particles of average particle size about 0.2 microns or less are also easier to stabilize than larger particles, the light-valve suspensions used in the present invention have less tendency to agglomerate or settle under the force of gravity.

The electro-optical device according to the invention may be light valves employing suspensions of orientable particles described herein, as well as other types of light controlling devices which utilize particle suspensions, such as electrophoretic displays wherein the particles are electrically caused to move between electrodes in a cell.

DESCRIPTION OF THE DRAWINGS

The present invention is illustrated in terms of preferred embodiments by reference to the accompanying drawings in which:

FIGS. 1 and 2 are cross-sectional views of ohmic and capacitive type light valves according to the present invention;

FIGS. 3 and 4 illustrate the closed (off, inactivated or dark) and open (on, activated, or light-transmitting) states of one type of light valve according to the present invention;

DETAILED DESCRIPTION OF THE INVENTION

Figure 5:
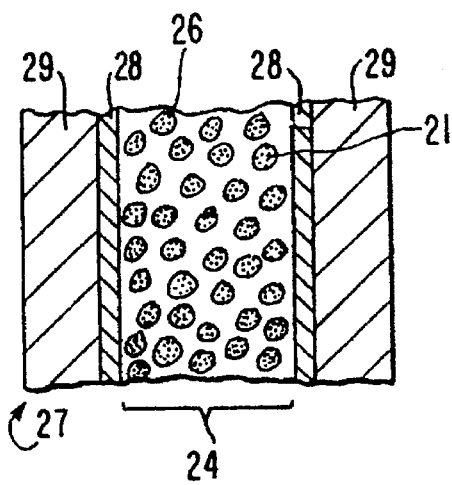
FIG. 5 is a fragmentary, cross-sectional schematic illustration of another embodiment of the present invention.

Referring to FIG. 1, a light valve generally indicated as 10 is formed of two sheets of glass 11 and 12 having transparent conductive coatings 13 and 14 on the inner surfaces thereof. The conductive coatings 13, 14 form area electrodes for the application of energizing voltage to the cell 10. The glass plates 11, 12 are separated by a spacer 15 sealed to the glass plates around the edges thereof to provide a chamber 16 therebetween in which the light valve suspension of particles 21 is placed. Particles 21 are anisometrically shaped and have an average particle size of about 0.2 microns or less, preferably about 0.1 microns or less.

Once the light valve suspension has been introduced, the cell 10 is sealed. The conductive coastings 13 and 14 are connected to an AC power supply 17. Inasmuch as the light valve suspension in chamber 16 is in contact with conductive coatings 13 and 14 this may be termed an ohmic type cell.

FIG. 2 is similar to FIG. 1 and corresponding parts are similarly designated. However, in FIG. 2 thin transparent substantially nonconductive coatings 18 and 19, (for example silicon monoxide, silicon dioxide, aluminum oxide, titanium dioxide or polyimide) are placed over the area electrodes 13 and 14 so that the conductive coatings are protected from the light valve suspension. Since layers 18 and 19 are of dielectric material, the electrodes are, in effect, capacitively coupled to the fluid suspension in chamber 16.

FIG. 3 schematically shows the closed OFF or dark condition of the cell 10. The particles 21 are illustrated in random orientation. A beam of light impinging on cell 10, indicated by arrows 22, is absorbed, and if there is a sufficient concentration of particles 21 in the suspension the cell can appear substantially opaque.

FIG. 4 schematically shows the open ON or light transmitting condition of the cell 10. Here, due to the application of an electric field, the particles 21 are aligned with their major axes perpendicular to the wall faces. In this condition, the particles intercept much less light than in the random state shown in FIG. 3. Consequently a considerable portion of the beam of light 22 passes through the cell, as indicated by the arrows 23.

FIG. 5 shows a light valve 27 that includes a film 24, comprising a cross-linked polymeric matrix material in the form of a transparent plastic 25 within which is distributed, a plurality of dark droplets of liquid light valve suspension 26 containing the particles 21. The globules are dark because the particles 21 within them are strongly light absorbing.

The light valve 27 has a protective layer 29 and an electrode 28 placed on both sides of the film 24. In this embodiment the electrodes 28 are on the inner surfaces of the protective layers 29 and in contact with the film 24. Dielectric overcoatings (not shown) could be placed over the electrodes if desired. The protective layers 29 and electrodes 28 in this embodiment are permanently secured to the film 24.

Figure 6:
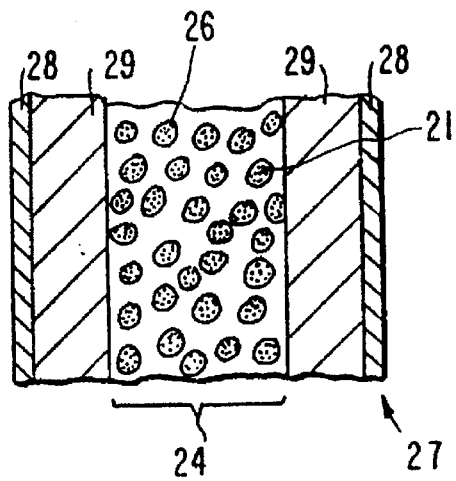
FIG. 6 is a fragmentary, cross-sectional schematic illustration of a second embodiment of the present invention.

FIG. 6 illustrates another embodiment of the light valve 27 in which protective layers 29, which have an electrode 28 on one side of each protective layer, are again placed on both sides of the film 24. However, unlike the embodiment shown in FIG. 5, in this embodiment the electrodes are on the outer surfaces of the protective layers 29, and are not in contact with the film 24. Again, the protective layers and electrodes in this embodiment are permanently secured to the film. Thus, in FIG. 5, the electrodes 28 may be coated over the film 24 using known techniques for coating electrodes on glass cell walls, while protective layers 29 may be coated over the electrodes 28, also using known techniques. In FIG. 6, the relationship of electrodes 28 and protective layers 29 is reversed.

Figure 7:
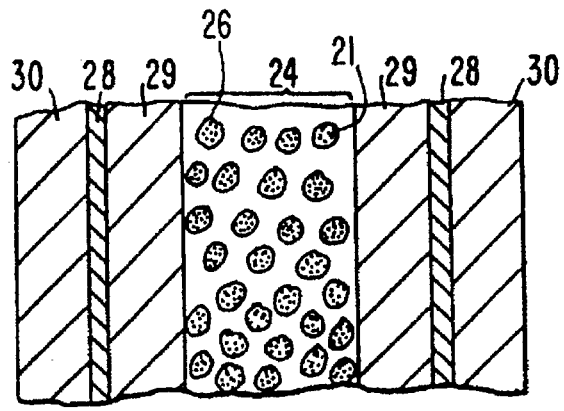
FIG. 7 is a fragmentary, cross-sectional schematic illustration of another embodiment of the present invention.

FIG. 7 shows a film 24 having protective layers 29 secured thereto. In this embodiment the film 24 is enclosed within hard rigid substrates 30. Electrodes 28 may be carried by the substrates 30 and face the protective layers 29.

It is presently preferred that the electrode 28 and protective layer 29 be in the form of a prefabricated assembly. In this embodiment, the electrode 28 and protective layer 29 shown in FIGS. 5–7 can be provided by a film 29, such as a plastic film that has been coated with an electrode 28 before application of the assembly to the film 24.

The hard rigid substrates 30 can be transparent materials, such as glass or plastic, such as polyethylene terephthalate or polycarbonate. For many applications of a light valve such as variable transmission windows, filters and eyewear, and backlit displays, it is desirable that both substrates be transparent. For such use in the present invention, the electrodes should also be made of transparent material, e.g., thin layers of tin oxide, indium tin oxide (hereinafter "ITO") or of conductive metals such as gold. For other applications such as mirrors and reflective displays it may only be desirable for one substrate and the electrode deposited thereon to be transparent, whereas the second substrate and/or electrode deposited on it can be made of specularly reflective material such as metal; the second substrate could also be made of a ceramic material with a transparent or reflective electrode thereon. Where diffuse rather than specular reflection is desired as in certain types of displays the rear electrodes can be overcoated with a diffuse white layer by any of various methods known in the art. See, for example U.S. Pat. Nos. 4,643,525 and 4,648,691.

Figure 8A:
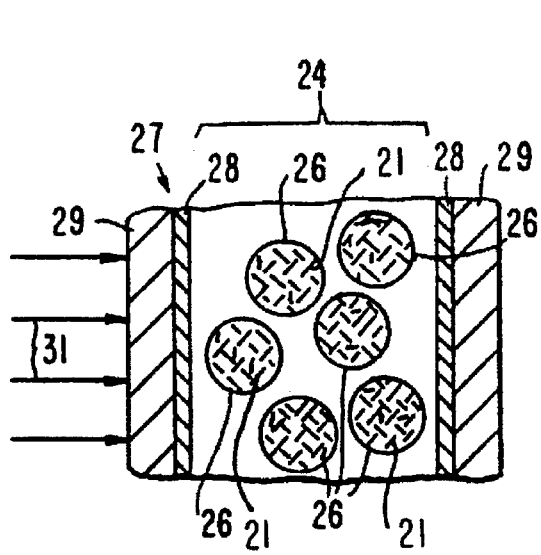
FIGS. 8A and 8B illustrate the closed and open states of one type of the light valve of the present invention.
Figure 8B:
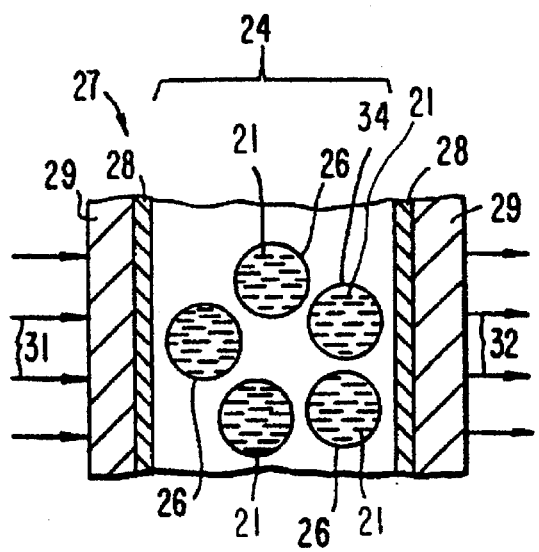

In FIG. 8A a beam of light 31 impinges on a film in a light valve of the present invention. It is assumed that no potential difference, i.e., electric field, exists between the electrodes 28. Hence the particles 21 dispersed within the microdroplets 26 of the liquid suspension are in random positions due to Brownian Movement. Because the particles 21 absorb light, a beam of light 31 impinging on the film is absorbed by particles 21 within the microdroplets 26. FIG. 8B assumes that an electric field (not shown) exists between the electrodes 28. As a result the particles 21 align within the microdroplets 26 and a considerable portion of the beam of light 31 passes through the film as indicated by the arrows 32.

Electrodes for use in light valves and methods of depositing electrodes on glass and plastic substrates are well known in the art. For example, see U.S. Pat. Nos. 3,512,876 and 3,708,219 which disclose articles having conductive and especially conductive transparent coatings on glass and plastic substrates and methods of forming or depositing such coatings.

PREPARATION OF ULTRAFINE PARTICLES

U.S. Pat. Nos. 5,030,669 and 5,106,533, each entitled "Pigment Dispersions", describe a method of forming ultrafine particles having an average particle diameter size of less than 0.1 microns and dispersions thereof. The method, which is applicable to both organic and inorganic pigments, (the term "pigment" includes both pigments and dyes) which is sometimes hereinafter referred to as the Evaporative Dispersion Process, comprises the following steps:

(a) vaporizing a nonelemental pigment or precursor to a nonelemental pigment in the presence of a nonreactive gas stream to provide ultrafine nonelemental pigment particles or precursor to nonelemental pigment particles, (b) when precursor particles to a nonelemental pigment are present, providing a second gas capable of reacting with said ultrafine precursor particles to a nonelemental pigment and reacting said second gas with said ultrafine precursor particles to a nonelemental pigment to provide ultrafine nonelemental pigment particles, (c) transporting said ultrafine nonelemental pigment particles in said gas stream to a dispersing medium, to provide a dispersion of nonelemental pigment particles in said medium, said particles having an average diameter size of less than 0.1 micrometer, wherein said method takes place in a reactor under subatmospheric pressure in the range of 0.001 to 300 torr.

The Evaporative Dispersion Process provides nonaqueous dispersions, comprising pigment particles having an average size of less than 0.1 micron dispersed or suspended in an organic medium. Because the decay time of a light valve suspension is a function of average particle size, a light valve suspension comprising particles whose longest dimension is less than about 0.2 micron, such as made by the Evaporative Dispersion Process, makes possible light valve suspensions with extremely fast decay times, which are valuable in many light valve applications.

Details of the Evaporative Dispersion Process and dispersions of particles made thereby are set forth in U.S. Pat. Nos. 5,030,669 and 5,106,533, which are incorporated herein by reference thereto.

Pigments useful in the present invention are well known in the art and are available commercially or can be prepared by methods well known in the art.

Inorganic pigments are nonelemental and can contain any metal but do not contain organics. Inorganic metal-containing pigments include metal oxides and metal salts such as metal silicates, metal halides, metal chromates, metal molybdates, metal plumbates, metal sulfides, and the like. Particularly useful salts and oxides are those of the metals copper, iron, titanium, cobalt, vanadium, magnesium, silver, zinc, and cadmium. Other examples of salts are apparent to those skilled in the art. The process may involve evaporation of the pigment itself, as with Cucl, or may involve evaporation of a precursor form with generation of the actual ultrafine pigment taking place during the transport stage prior to contacting the dispersing medium. An example would be evaporation of iron metal using argon as a nonreactive gas with subsequent exposure of the ultrafine iron particles (pigment precursor particles) to a reactive oxygen environment, thereby forming ultrafine iron oxide coated pigment particles (the particle core being iron) prior to contacting the dispersing medium. Since the reactive gas is introduced at a site remote from the vaporization source after the ultrafine pigment precursor particles have formed, the final ultrafine pigment particles consist of a central core and an outer shell, where the central core can be metal and where the outer shell can be comprised of a layer formed by reaction of the reactive gas with the ultrafine pigment precursor particles.

Organic pigments include those containing chromophore groups such as: azo type, phthalocyanine type, quinacridone type, anthraquinone type, dioxagine type, indigo type, thio-indigo type perynone type, perylene type, isoindolene type, and the like. Other examples are apparent to those skilled in the art.

Representative examples of organic pigments include metal phthalocyanines which are described in detail in "Phthalocyanine Compounds", by F. H. Moser and A. L. Thomas, Rheinhold Publishing Corporation, New York (1963). A list of such phthalocysinines is set forth in the aforesaid U.S. Pat. No. 5,036,669.

Examples of other organic pigments that may be used and which are commercially available include Anthrapyrimidine Yellow (C.I. Pigment Yellow 108), Disazo Yellow GG (C.I. Pigment Yellow 128), Quinacridone Magenta Y (C.I. Pigment Red 122), Phthalo Blue beta (C.I. Pigment Blue 15:3), Phthalo Blue alpha (C.I. Pigment Blue 15:2), Permanent Red 2B (calcium) (C.I. Pigment Red 48:2) Quinacridone Magenta B (C.I. Pigment Red 202), Paliotol R Yellow 183 (no C.I. No.), Diarylide Yellow (C.I. Pigment 21108), Wachtung Red B (C.I. Pigment Red 48), Perinone Orange (C.I. Pigment Orange 43), Tetrachloroisoindolinone Yellow R (C.I. Pigment Yellow 110), Perylene Red Y (C.I. Pigment Red 224), and Perylene Maroon (C.I. Pigment 179).

Although the aforesaid patents relating to the Evaporative Dispersion Process describe the particles made by the process mainly as pigments and pigment precursors, in fact the Evaporative Dispersion Process can also be used to make metallic particles which are also within the scope of the present invention. Metallic particles can be valuable in light valves because of their ability to reflect infrared radiation (heat) and because of their inertness. By using a magnetic field, for example, acicular particles of iron, cobalt and nickel can be made with the Evaporative Dispersion Process. Other metals can also be made into ultrafine particles by the process, although such particles generally have lower aspect ratios than the magnetic metal particles made as described above.

After particle formation, the ultrafine particles which are suspended in a gas stream are transported to a liquid dispersing medium, for example by bubbling the gas containing particles into or impinging the gas containing the particles onto the dispersing medium, to provide a dispersion of pigment particles in the medium. Any liquid that does not attack the particles can theoretically be used to disperse the particles. However, water and polar nonaqueous liquids, because of their high electrical conductivities, are less useful in the present invention than other liquids described hereinafter because liquid suspensions for light valves require relatively high electrical resistivities (low conductivity) as is well known in the art. Therefore, use of water or polar nonaqueous liquids as the liquid dispersing medium of the present invention would require additional steps to transfer the particles into a different liquid suitable for use in a light valve.

As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail the use of polyhalides of quinine alkaloid acid salts. The particles may be light-absorbing or light-reflecting.

Also, the particles may be particles of a hydrogenated polyhalide of a quinine alkaloid acid salt, such as dihydrocinchonidine sulfate polyiodide, as described in U.S. Pat. No. 4,131,334, or a light-polarizing metal halide or polyhalide, such as cupric bromide or purpureocobaltchloride sulfate polyiodide, as, e.g., in U.S. Pat. Nos. 1,956,867. Other light-polarizing polyhalide particles are described in U.S. Pat. Nos. 4,877,313 and 5,002,701. The above mentioned patents and all other patents, patent applications and references mentioned herein are incorporated herein by reference thereto.

In theory, any type of particle capable of reflecting, absorbing and/or transmitting desired wavelengths of visible light can be used in the liquid light valve suspension. The shape of the particles used in the light valve suspension should be "anisometric", i.e. the shape or structure of the particle is such that in one orientation the particle intercepts more light than in another orientation. Particles which are needle-shaped, rod-shaped, lath-shaped, or in the form of thin flakes, are suitable.

Light-absorbing particles comprise many types of material including colored orientable pigments and dyes, e.g. garnet red, conductive black or grey material such as graphite or carbon black, dichroic dyes such as are widely used in guest-host liquid crystal devices, and light-polarizing materials, e.g., cupric bromide, and polyhalides.

LIQUID SUSPENDING MEDIUM

In general, the liquid suspending medium may comprise one or more electrically resistive, chemically inert liquids that will both suspend the particles and dissolve any polymeric stabilizer used to reduce the tendency of the particles to agglomerate and thus keep the particles in suspension. Liquid suspending media that are known in the art are useful herein, such as the liquid suspending media disclosed in U.S. Pat. No. 4,247,175. In general one or both of the liquid suspending medium or the polymeric stabilizer dissolved therein is chosen so as to maintain the suspended particles in gravitational equilibrium.

Any of the liquids of the prior light valve art can be used to disperse the particles. Such liquids comprise, for example, without limitation thereto (a) many aliphatic and aromatic esters such as isopentyl acetate, hexylacetate and phenyl acetate which have boiling points below 200° C. at room temperature and normal atmospheric pressure; (b) many high boiling point ester plasticizers such as tri-n-propyltrimellitate, tri-n-butyl trimellitate, dioctyl adipate, diisodecyl adipate and tricresyl phosphate; (c) many halogenated liquids such as chlorofluocarbon liquids, chloroform, carbon tetrachloride and Halocarbon Oil (an oligomer of chlorotrifluorethylene); (d) silicones; and (e) liquid polymers such as those described hereinafter for use in the second type of light valve film.

A light valve suspension useful in the present invention is described in U.S. Pat. No. 4,407,565 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Preferably, the liquid suspending medium also comprises a miscible electrically resistive organic liquid such as, for example, trialkyl trimellitate, etc. to provide gravitational equilibrium to the suspended particles and to assist in dispersing the particles in the liquid suspending medium. Other materials useful as the miscible electrically resistive organic liquid are those disclosed U.S. Pat. No. 4,772,103, and details concerning the liquid suspending material may be found in U.S. Pat. No. 4,407,565.

Other types of suspensions which do not incorporate such halogenated liquids can also be used and can maintain the particles in gravitational equilibrium if a sufficient quantity of stabilizing polymer is employed therein.

Another useful light valve suspension is based on the use as the liquid suspending medium of non-volatile or minimally volatile organic liquids, commonly classified as plasticizers. Such "plasticizer" liquid suspending media may comprise one or more electrically resistive, chemically inert, relatively non-volatile (high boiling) organic liquids that will suspend the particles and will dissolve the polymeric stabilizer. For example, where the polymeric stabilizer includes a solid poly(meth)acrylate, useful liquid suspending media include liquid plasticizers for poly(meth)acrylates, such as adipates, benzoates, glyceryl triacetate, isophthalates, mellitates, oleates, chloroparaffins, phthalates, sebacates and the like. Liquid suspending media for other solid polymeric stabilizers may be similarly selected form liquids useful as plasticizers for such polymers. Preferably, trialkyltrimellitates, such as tri-n-propyl- or tri-n-butyltrimelliatate and/or dialkyl adipates, such as di-2-ethylhexyl adipate, may be used as the liquid suspending medium for solid polymeric stabilizers based on copolymers of neopentyl(meth)acrylate.

POLYMERIC STABILIZER

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles.

Preferably, to keep the particles in suspension, the liquid suspending medium may also comprise as the solid polymeric stabilizer an A-B type block polymer as disclosed in U.S. Pat. No. 5,279,773 or a copolymer as disclosed in U.S. Pat. No. 4,164,365.

Nitrocellulose and/or other solid polymeric stabilizers may also be usefully provided in the liquid suspending medium in addition to the block polymer. It is preferred to use just enough A-B block polymer to maintain the particles in suspension, the amount to be used for a given light valve suspension being empirically determined, as is known. Usually, the amount of the solid polymeric stabilizer will be from about 1% to about 30%, such as from 5% to about 25%, by weight, based on the total weight of the liquid light valve suspension. However, while the use of a solid polymeric stabilizer is preferred, it need not be used in all cases. Indeed, liquid polymeric stabilizers may be used to advantage, as described in the published International Application PCT/US93/10485.

FILMS

As stated above, the liquid light valve suspension may also be in the form of a film. One type of film that is suitable for use as the light-modulating unit of a light valve comprises a cross-linked polymer matrix having droplets of a liquid light valve suspension distributed in the cross-linked polymer matrix. In one embodiment such film, while in its cured, cross-linked form is swollen with a liquid to form a liquid-swollen film that scatters less light than the same film prior to being swollen with said liquid. Useful cross-linkable oligomers and polymers include liquid cross-linkable polyorganosiloxanes, polybutadienes, polyolefins, silicone gums, polyacryamides and the like. Virtually any particle which can be oriented by an electric or magnetic field can be used in the droplets of the suspension used in such films. The liquid light valve suspension distributed in the film of the present invention may include any of the liquid suspending media previously proposed in the art for use in light valves for suspending the particles. A detailed description of this type of film is found in published International Application PCT/US92/09034.

A second type of film for use as the light-modulating unit of a light valve comprises a cross-linked polymer matrix having droplets of a liquid light valve suspension distributed in the cross-linked polymer matrix, said liquid light valve suspension comprising particles suspended in a liquid suspending medium, said polymer matrix comprising a main chain that is insoluble in said liquid suspending medium and pendant groups that are soluble in the liquid suspending medium. The liquid suspending medium may comprise in whole or in part a non-volatile liquid polymeric stabilizer that is effective to prevent agglomeration of the suspended particles. An example of such a liquid polymeric stabilizer is a random copolymer of butyl acrylate/maleic anhydride, 98%/2% by weight. A second example of such a liquid polymeric stabilizer is a random copolymer of butyl acrylate/heptafluorobutyl acrylate/maleic anhydride, 67%/32%/1% by weight. Many other liquid polymeric stabilizers of course can be made by varying the monomers and/or varying their percentages. Because of its unique structure the cross-linked polymer of this type of film is sometimes referred to as a cross-linked emulsifier, and prior to cross-linking as a cross-linkable emulsifier. A detailed description of this type of film is found in published International PCT/US93/10485.

In some cases the liquid dispersing medium of the present invention can itself comprise the sole liquid in a light valve suspension. Alternatively, a mixture of two or more liquids can comprise the liquid dispersing medium. Yet another possibility is for one or a plurality of liquids to be used as the liquid dispersing medium of the invention, and subsequently (a) to increase the particle concentration by boiling off some of the liquid or (b) to reduce the particle concentration by adding more of one or more of the same or other liquids to the dispersion. Moreover, it is possible to use a low boiling liquid such as isoamyl acetate (boiling point 142° C.) as the initial liquid dispersing medium of a dispersion, then add to it a high boiling liquid such as tri-n-butyl trimellitate, a plasticizer, and then evaporate off the lower boiling liquid; by this general method as one can replace a low boiling liquid with a higher boiling liquid as the liquid dispersing medium.

EVAPORATE DISPERSION PROCESS

As described in U.S. Pat. No. , 5,030,669 an apparatus for providing dispersions of ultrafine particles comprises:

a) a furnace connected to a collection vessel, the furnace containing a heating means (e.g., resistive, inductive, e-beam, infrared, laser, plasma jet) and adapted to contain at least a first and optionally a second gas inlet tube, said second tube being located downstream from said first tube, and a means (e.g., pump such as a rotary oil pump, an oil diffusion pump, piston pump, a Roots TM blower, and a turbomolecular pump) for evacuating the furnace and collection vessel, the vessel containing a dispersing medium;

(b) means (e.g., a ceramic, plastic, or metal crucible or slab that can be preloaded with material or which can be continuously or batch-wise fed during operation of the apparatus, or the electrodes can be the means) for introducing an organic or inorganic pigment or pigment precursor into said furnace and evacuation thereof;

(c) means (e.g., a micro metering valve, electronic flow controller, or gas dispersing tube) for introducing through the first inlet tube a first, non-reactive gas stream into the furnace;

(d) means (e.g., energy input as by e-beam, infrared, laser, inductive, resistive, or plasma jet) for evaporating the pigment or pigment precursor particles into the first gas stream;

(e) means for allowing condensation of the vaporated pigment or pigment precursor particles (e.g., decreasing the temperature, raising the pressure, changing the chemical nature of the nonreactive gas, controlling the length of the transfer tube, controlling the gas flow rate, or combinations thereof) in the first gas stream to produce a dispersion of ultrafine pigment or pigment precursor particles in the first gas stream;

(f) optionally, means (e.g., a micro metering valve, electronic flow controller, or gas dispersing tube) for introducing into the furnace through the second inlet tube a second, reactive gas stream, to allow reaction with the pigment precursor particles, to provide ultrafine pigment particles;

(g) means for collecting said particles in the collection vessel (e.g., bubbling into or impinging particles onto the dispersing medium).

The nonreactive gas can be virtually any gas that does not react with the pigment under the conditions of the experiment. Typical choices are He, Ne, Ar, Xe, and $N_2$. Mixtures of two or more nonreactive gases can also be used. When modification of pigments or pigment precursors is desired, a reactive gas can be introduced through a gas inlet that is positioned so as to minimize reaction with the bulk material in the crucible and allow thorough mixing of the reactive gas with the particles entrained in the gas stream, thereby allowing reaction with the particles to occur. The reactive and nonreactive gases generally are at room temperature but the temperature can be elevated or reduced as desired. The term reactive includes 1) direct reaction with the particles, as in the case of metals, for example, with $O_2$, NO, $NO_2$, $CO_2$, CO, $AsH_3$, $H_2S$, $H_2Se$, $NH_3$, trimethylchlorosilane, methylamine, ethylene oxide, water, HF, HCl, or $SO_2$, or combinations thereof, to form the corresponding oxides or other compounds; 2) wetting, as described in UK patent 736,590 to increase dispersibility in which pigment particles are exposed to the vapor of a volatile liquid which may be identical to the dispersing medium or may be miscible with the dispersing medium, prior to contacting the bulk dispersing medium so as to create a solid/liquid interface while the pigment particles are suspended in the gas stream; and 3) adsorption, in which a volatile substance is introduced in the gas prior to contacting the dispersing medium, similar to wetting, but the substance is either not a liquid under normal conditions (atmospheric pressure 25° C.), the substance is not miscible with the dispersing medium, or else the substance acts to protect the surface of the ultrafine pigment particles from the dispersing medium or additives within the dispersing medium. Typical substances that could be adsorbed include polymers such as poly (methylmethacrylate) and polystyrene, and surface active agents.

Temperatures for evaporation of pigment useful in the method of the present invention depend on the type of pigment being used and generally range from 25° C. to around 500° C. when organic pigments are used and from 25° C. to around 1200° C. when inorganic pigments or inorganic pigment precursors are used.

Temperatures of the dispersing medium useful in the method of the present invention depend on the particular medium being used and generally range from −78° C. to 400° C., preferably from −50° C. to 300° C., and most preferably from 0° C. to 200° C.

Pressures useful in the method of the present invention range from about 0.001 to 300 torr, preferably 0.01 to 200 torr, more preferably from 0.01 to 100 torr, and most preferably from 0.1 to 50 torr. The composition of the combination nonreactive and reactive gas stream can be from about 5 to 100% nonreactive gas or combination of nonreactive gases, preferably from 25 to 100%, more preferably from 50 to 100%. A reactive gas introduced through an additional inlet downstream from the evaporation source can be present as a component in the gas stream in a percent ranging from 0 to about 95%, preferably from 0 to 75%, and more preferably, 0 to 50%.

EXAMPLE 1

Using the Evaporative Dispersion Process and the conditions disclosed in Example 2 of U.S. Pat. No. 5,030,669 acicular particles of blue colored copper phthalocyanine are formed having an average diameter of approximately 0.1 micron. When the particles are dispersed in isopentyl acetate in which nitrocellulose polymer is dissolved, a liquid light valve suspension is thereby formed. When this blue colored light valve suspension is placed in a light valve having two glass walls and a voltage is applied to the electrodes of the light valve, the suspension will become more transmissive as the acicular particles orient in the applied electric field.

EXAMPLE 2

A dispersion of anisometric copper phthalocyanine particles prepared by the Evaporative Dispersion Process was suspended in isopentyl acetate to form "Dispersion A". Dispersion A had a particle concentration of about 1% by weight and contained about 3% by weight nitrocellulose polymer dissolved in it. The particles in Dispersion A had an average particle size larger than about 1 micron.

Dispersion A was placed in a light valve test cell having an internal gap of 33 mils. Initial light transmission of the test cell before voltage was applied was about 18%. When voltage was applied to the test cell electrodes at a frequency of 10 Kilohertz the test cell began to darken. At about 500 volts peak-to-peak, the test cell became more light transmissive and continued becoming more transmissive as voltage was increased. At 2000 volts peak-to-peak (equivalent to an electric field strength of 21.7 volts per mil RMS) light transmission reached 40%. Similar results were observed in this test cell when a voltage of 2000 volts was applied at frequencies of 60 Hertz and 400 Hertz.

Following the above procedure, a dispersion of anisometric copper phthalocyamine particles of average particle size of about 0.2 microns is obtained by the Evaporative Dispersion Process, and is suspended in isopentyl acetate to provide a particle concentration of about 1% by weight and a nitrocellulose concentration of about 3% by weight. This suspension is filled into a test cell with a 33 mil gap and is tested as above. Similar results will be obtained; as voltage is applied to the test cell, the light valve will become more light transmissive.

EXAMPLE 3

Approximately 80 grams of Dispersion A of Example 1 was centrifuged for 25 minutes at 2,500 RPM and then centrifuged an additional 25 minutes at 5,000 RPM. The supernatant amounting to about 79.7 grams was saved, and the sediment amounting to 0.29 grams was collected and redispersed in about 0.87 grams of isopentyl acetate to form Dispersion B. The centrifugation process removed all but a trace amount of the nitrocellulose from Dispersion A so that Dispersion B essentially contained only that amount of nitrocellulose which is coated onto the particles. Dispersion B contained about 25% of the coated particles which had an average particle size larger than about 1 micron. Dispersion B was placed in a light valve test cell having an internal gap of 5 mils, and a voltage of 21.7 volts per mil RMS at 10 Kilohertz frequency was applied to the test cell. The suspension darkened as voltage was applied. Thus, the suspension had an optical density of 2.45 in the absence of applied voltage, and an optical density of 2.7 when the test cell was in the ON state.

At 60 Hertz and 400 Hertz frequency the same results were observed. No increase in light transmission was observed at any voltage, unlike the suspension of Example 2. This is believed to be attributed to the removal of most of the nitrocellulose polymer from the suspension.

EXAMPLE 4

The supernatant saved in Example 3 was centrifuged at 9,000 RPM for 40 minutes and the sediment (0.07 grams), comprising small particles of about 0.2 micron average particle size was collected and redispersed in 0.50 grams of isopentyl acetate to form Dispersion C. Again the collected sediment contained only a trace amount of nitrocellulose. Dispersion C contained about 12% by weight of the copper phthalocyanine particles coated with nitrocellulose of about 0.2 micron average particle size.

Dispersion C was placed in a light valve test cell having an internal gap of 33 mils. When tested at 10 Kilohertz, Dispersion C darkened as voltage was applied. Thus, the optical density was observed to increase from about 2.25 (at no voltage) to 2.7 as voltage increased to a field strength of about 21.7 volts per mil RMS. At 60 Hertz and 400 Hertz frequencies similar darkening was observed. No increase in light transmission was observed at any of these frequencies under applied voltage.

Other particles in dispersions made by the Evaporative Dispersion Process can likewise be used as liquid light valve suspensions. The amount of voltage required to be effective in any particular case depends upon the size and shape of the particles and the type of particle. In general particles that are relatively conductive or have a relatively high dipole moment will require less voltage to orient than particles of the same size and shape that are less conductive or have a relatively low dipole moment.

It should be noted that a light valve suspension can comprise more than one type of particle. Thus two or more different pigments or other types of particles may be combined in any useful proportions to form suspensions having a vast number of different off-state colors.

It should also be noted that a dispersion can be assembled comprising one or more particles that will absorb visible light efficiently, and one or more particles therein which may be the same or different than the aforesaid visible light-absorbing particles, which have the characteristic that they efficiently absorb or reflect infrared radiation (heat) in the near infrared and/or far infrared region of the electromagnetic spectrum. Because of the extremely small size of particles produced by the Evaporative Dispersion Process, a suspension of such particles scatter very little visible light whereas particles used in the prior light valve art scattered significantly more visible light. By means of this new type of suspension therefore, a light valve may be produced that enables one not only to control visible light without significant light scatter but also enables one to absorb, reflect and/or control infrared radiation.

While specific embodiments of the invention have been described it will be appreciated that the invention is not limited thereto and many modifications thereof may be made by one skilled in the art which falls within the spirit and scope of the invention.

We claim:

1. An electro-optical device, comprising a cell formed of opposed cell walls, a light-modulating unit comprising a suspension containing anisometric particles suspended in a liquid suspending medium between said cell walls, and opposed electrode means operatively associated with said cell walls for applying an electrical field across said suspension, said anisometric particles having an average dimension of about 0.001 to 0.2 microns and having been prepared by the Evaporative Dispersion Process.

2. The device according to claim 1, wherein said electro-optical device is a light valve and said suspension is a light valve suspension.

3. The device according to claim 2, wherein said particles have an average particle size of about 0.1 microns or less.

4. The device according to claim 2 wherein said light valve suspension is a liquid suspension or a film.

5. The device according to claim 2, exhibiting no significant amount of visible light scatter.

6. The device according to claim 5, wherein said light valve suspension absorbs near infrared and/or far infrared radiation.

7. The device of claim 5, wherein said light valve suspension reflects near infrared and/or far infrared radiation.

* * * * *